(12) United States Patent
Ezick et al.

(10) Patent No.: US 11,797,894 B1
(45) Date of Patent: *Oct. 24, 2023

(54) SYSTEM AND METHOD FOR CONFIGURATION OF AN ENSEMBLE SOLVER

(71) Applicant: QUALCOMM TECHNOLOGIES, INC, San Diego, CA (US)

(72) Inventors: James Ezick, Canonsburg, PA (US); Jonathan Springer, Carbondale, IL (US); Nicolas T. Vasilache, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/098,916

(22) Filed: Nov. 16, 2020

Related U.S. Application Data

(60) Continuation of application No. 15/617,602, filed on Jun. 8, 2017, now Pat. No. 10,839,297, which is a division of application No. 13/910,467, filed on Jun. 5, 2013, now Pat. No. 9,684,865.

(60) Provisional application No. 61/655,965, filed on Jun. 5, 2012.

(51) Int. Cl.
  *G06N 20/20* (2019.01)
  *G06N 20/00* (2019.01)
  *G06N 5/02* (2023.01)
  *G06N 5/01* (2023.01)

(52) U.S. Cl.
  CPC ............. *G06N 20/20* (2019.01); *G06N 5/01* (2023.01); *G06N 5/02* (2013.01); *G06N 20/00* (2019.01)

(58) Field of Classification Search
  None
  See application file for complete search history.

(56) References Cited

U.S. PATENT DOCUMENTS

| | | |
|---|---|---|
| 5,442,699 A | 8/1995 | Arnold et al. |
| 5,442,797 A | 8/1995 | Casavant et al. |
| 5,613,136 A | 3/1997 | Casavant et al. |
| 5,742,814 A | 4/1998 | Balasa et al. |

(Continued)

OTHER PUBLICATIONS

Ahmed N., et al., "Tiling Imperfectly-Nested Loop Nests", IEEE 2000, 14 pgs.

(Continued)

*Primary Examiner* — Alan Chen
(74) *Attorney, Agent, or Firm* — Seyfarth Shaw LLP

(57) ABSTRACT

In a system for enabling configuration of an ensemble of several solvers, such that the ensemble can efficiently solve a constraint problem, for each one of several candidate configurations, an array of scores is computed. The array corresponds to a statistical parameter related to a problem solution, and the computation is based on, at least in part, a set of features associated with the problem. One candidate configuration is assigned to a solver, and based on the array of scores associated with that candidate configuration the same or a different candidate configuration is assigned to a another solver. A system for dynamically reconfiguring an ensemble of solvers obtains runtime data from several solvers, and a new configuration is determined by applying a machine learning and/or heuristic analysis procedure to the runtime data. The configuration of a solver may be updated according to the new configuration while that solver is running.

18 Claims, 2 Drawing Sheets

(56) References Cited

U.S. PATENT DOCUMENTS

| | | |
|---|---|---|
| 5,920,854 A | 7/1999 | Kirsch et al. |
| 5,953,531 A | 9/1999 | Megiddo et al. |
| 6,006,033 A | 12/1999 | Heisch |
| 6,018,735 A | 1/2000 | Hunter |
| 6,038,398 A | 3/2000 | Schooler |
| 6,131,092 A | 10/2000 | Masand |
| 6,279,113 B1 | 8/2001 | Vaidya |
| 6,327,699 B1 | 12/2001 | Larus et al. |
| 6,338,057 B1 | 1/2002 | Weeks |
| 6,651,246 B1 | 11/2003 | Archambault et al. |
| 6,754,650 B2 | 6/2004 | Cho et al. |
| 6,772,415 B1 | 8/2004 | Danckaert et al. |
| 6,785,677 B1 | 8/2004 | Fritchman |
| 6,792,546 B1 | 9/2004 | Shanklin et al. |
| 6,880,087 B1 | 4/2005 | Carter |
| 6,912,526 B2 | 6/2005 | Akaboshi |
| 6,952,694 B2 | 10/2005 | Mathur et al. |
| 6,952,821 B2 | 10/2005 | Schreiber |
| 7,086,038 B2 | 8/2006 | Cronquist et al. |
| 7,185,327 B2 | 2/2007 | Scales |
| 7,225,188 B1 | 5/2007 | Gai et al. |
| 7,260,558 B1 | 8/2007 | Cheng et al. |
| 7,594,260 B2 | 9/2009 | Porras et al. |
| 7,634,566 B2 | 12/2009 | Turner et al. |
| 7,757,222 B2 | 7/2010 | Liao et al. |
| 8,087,010 B2 | 12/2011 | Eichenberger et al. |
| 8,108,845 B2 | 1/2012 | Little et al. |
| 8,230,408 B2 | 7/2012 | Eng |
| 8,250,550 B2 | 8/2012 | Luszczek et al. |
| 8,255,890 B2 | 8/2012 | Luszczek et al. |
| 8,307,347 B2 | 11/2012 | Austin et al. |
| 9,684,865 B1 | 6/2017 | Ezick et al. |
| 10,839,297 B1 | 11/2020 | Ezick et al. |
| 2002/0021838 A1 | 2/2002 | Richardson et al. |
| 2003/0097652 A1 | 5/2003 | Roediger et al. |
| 2004/0068501 A1 | 4/2004 | McGoveran |
| 2005/0114700 A1 | 5/2005 | Barrie et al. |
| 2006/0048121 A1 | 3/2006 | Blainey et al. |
| 2006/0048123 A1 | 3/2006 | Martin |
| 2006/0085858 A1 | 4/2006 | Noel et al. |
| 2007/0033367 A1 | 2/2007 | Sakarda et al. |
| 2007/0074195 A1 | 3/2007 | Liao et al. |
| 2007/0112723 A1 | 5/2007 | Alvarez et al. |
| 2007/0192861 A1 | 8/2007 | Varghese et al. |
| 2008/0010680 A1 | 1/2008 | Cao et al. |
| 2009/0037889 A1 | 2/2009 | Li et al. |
| 2009/0083724 A1 | 3/2009 | Eichenberger et al. |
| 2009/0119677 A1 | 5/2009 | Stefansson et al. |
| 2009/0259997 A1 | 10/2009 | Grover et al. |
| 2009/0307673 A1 | 12/2009 | Eichenberger et al. |
| 2010/0050164 A1 | 2/2010 | Van De Waerdt et al. |
| 2010/0162225 A1 | 6/2010 | Huang et al. |

OTHER PUBLICATIONS

Ahmed N., et al., "Synthesizing Transformations for Locality Enhancement of Imperfectly-Nested Loop Nests", ACM ICS 2000, pp. 141-152.
Aho A.V., et al., "Compilers: Principles, Techniques, & Tools 2nd Edition", 2006, pp. 173-186.
Aho A.V., et al., "Efficient String Matching: An Aid to Bibliographic Search", Communications of the ACM, vol. 18, No. 6, Jun. 1975, pp. 333-340.
Aigner. G., et al., "An Overview of the SUIF2 Compiler Infrastructure", Computer Systems Laboratory, Stanford University, 1999, pp. 1-14.
Aldwairi M., et al., "Configurable String Matching Hardware for Speeding Up Intrusion Detection", ACM Sigarch Computer Architecture News, Vo. 33, No. 1, Mar. 2005, pp. 99-107.
Allen J.R., et al., "Conversion of Control Dependence to Data Dependence", ACM 1983, pp. 177-189.
Aloul F.A., et al, "Solution and Optimization of Systems of Pseudo-Boolean Constraints", IEEE Transactions on Computers, vol. 56, No. 10, Oct. 2007, 11 pages.
Ancourt C., et al., "Scanning Polyhedra with DO Loops", Proceedings of the third ACM Sigplan Symposium on Principles and Practice of Parallel Programming, Apr. 21-24, 12 pgs. 1991.
Appel A.W., "Deobfuscation is in NP", Princeton University, Aug. 21, 2002, 2 pgs.
Ayers A., et al., "Aggressive Inlining", PLDI '92 Las Vegas, NV, USA.
Ball T., et al., "Branch Prediction for Free", Technical Report #1137, University of Wisconsin, 1993, 29 pgs.
Barak B., et al., "On the (Im)possibility of Obfuscating Programs", Advances in Cryptology, Crypto 2001, vol. 2139, pp. 1-18.
Barthou D., et al., "Maximal Static Expansion", International Journal of Parallel Programming, vol. 28, No. 3, 2000, 25 pgs.
Bastoul C., "Code Generation in The Polyhedral Model is Easier than You Think", Proceedings of the 13th International Conference on Parallel Architecture and Compilation Techniques, In PACT'04, pp. 7-16, Juan-les-Pins, Sep. 2004, 10 Pages.
Bastoul C., "Efficient Code Generation for Automatic Parallelization and Optimization", Proceedings of the Second International Symposium on Parallel and Distributed Computing, 2003, 8 Pages.
Bastoul C., et al., "Putting Polyhedral Loop Transformations to Work", INRIA, No. 4902, Jul. 2003, 14 Pages.
Bastoul, C., "Generating Loops for Scanning Polyhedra: CLooG User's Guide", First Version, Rev. 1.6, Apr. 8, 2004, pp. 1-30.
Bednara M., et al., "Synthesis for FPGA Implementations From Loop Algorithms", In Proceedings of the Int. Conf. on Engineering of Reconfigurable Systems and Algorithms (ERSA), Jun. 2001, 7 pages.
Berkelaar M., et al., "The IpSolve Package", Sep. 21, 2007, pp. 1-9.
Bik A.J.C., et al., "Implementation of Fourier-Motzkin Elimination", Technical Report 94-42, Department of Computer Science, Leiden University, 1994, 10 Pages.
Bondhugula U., et al, "A Practical and Fully Automatic Polyhedral Program Optimization System", OSU OSU-CISRC-10/07-TR70, Dec. 14, 2007, pp. 1-15.
Bondhugula U., et al., "A Practical Automatic Polyhedral Parallelizer and Locality Optimizer," in Acm Sigplan Programming Languages Design and Implementation (PLDI '08), Tucson, Arizona, Jun. 7-13, 2008, 13 pages.
Bondhugula U., et al., "Affine Transformations for Communication Minimal Parallelization and Locality Optimization of Arbitrarily Nested Loop Sequences", Ohio State University, CSE Technical Report, OSU-CISRC-5/07/TR43, 30 pages.
Bondhugula U., et al., "Automatic Mapping of Nested Loops to FPGAs", Ohio State University, Mar. 14-17, 2007, 12 Pages.
Bondhugula U., et al., "Towards Effective Automatic Parallelization for Multicore Systems", In Proceeding of 22nd IEEE International Symposium on Parallel and Distributed Processing, (IPDPS 2008), Miami, Florida USA, Apr. 14, 2008, 6 Pages.
Boulet P., et al., "Scanning Polyhedra without DO-Loops", Parallel Architectures and Compilation Techniques, 1998, Proceedings 1997 International Conference on Oct. 12-18, 1998, pp. 4-11.
Boulet P., et al., "(Pen)-Ultimate Tiling?", Laboratoire de l'Informatique du Parallelisme, Research Report No. 93-96, Nov. 1993, pp. 1-17.
Briggs P., et al., "Effective Partial Redundancy Elimination", Sigplan PLDI, Jun. 1994, 12 pages.
Brumley D., et al., "Towards Automatic Generation of Vulnerability-Based Signatures", Proceedings of the 2006 IEEE Symposium on Security and Privacy, 15 pages.
Buluc A., et al., "Parallel Sparse Matrix-Matrix Multiplication and Indexing; Implementation and Experiments", SIAM Journal of Scientific Computing (SISC), 2012, vol. 34, No. 4, pp. C170-C191.
Burger D., et al., "Scaling to the End of the Silicon with EDGE Architectures", Computer, IEEE Computer Society, Jul. 2004, pp. 44-55.
Burke M., et al., "Flow-Insensitive Interprocedural Alias Analysis in the Presence of Pointers", Lecture Notes in Computer Science, Proceedings from the 7th International Workshop on Languages and Compilers for Parallel Computing, vol. 892, 1995, 18 pgs.

(56) References Cited

OTHER PUBLICATIONS

Chang R., et al., "Parallel Sparse Supports for Array Intrinsic Functions of Fortran 90", J. Supercomputing. 18(3):305-339, (2001).
Cifuentes C., "A Structuring Algorithm for Decompilation", XIX Conferencia Latinoamericana de Inforamatica, Buenos Aires, Argentina, Aug. 2-6, 1993, pp. 267-276.
Cifuentes C., "Structuring Decompiled Graphs", Department of Computer Science, University of Tasmania, 1994, 15 pgs.
Clauss P., et al., "Automatic Memory Layout Transformations to Optimize Spatial Locality in Parameterized Loop Nests", ACM Sigarch Computer Architecture News, vol. 28, No. 1, 2000, pp. 1-9.
Clauss P., et al., "Deriving Formulae to Count Solutions to Parameterized Linear Systems using Ehrhart Polynomials: Applications to the Analysis of Nested-Loop Programs", Apr. 10, 1997, pp. 1-29.
ClearSpeed: "Accelerator Technology Primer, ClearSpeed Technology Primer", ClearSpeed Technology plc., 2006, 16 pages.
ClearSpeed: "ClearSpeed Programming Model: An introduction", ClearSpeed Technology Plc., 2007, 97 pages.
ClearSpeed: "ClearSpeed Programming Model: Card-Side Libraries", ClearSpeed Technology Plc., 2007, 65 pages.
ClearSpeed: "ClearSpeed Programming Model: Optimizing Performance", ClearSpeed Technology Plc., 2007, 64 pages.
ClearSpeed: "CSX Processor Architecture Whitepaper", ClearSpeed Technology Plc., 2006, 16 pages.
ClearSpeed: "Introduction to ClearSpeed Acceleration", ClearSpeed Technology Plc., 2007, 27 pages.
ClearSpeed: "Introduction to ClearSpeed Acceleration", Powerpoint presentation, ClearSpeed Technology Plc, 2007, 133 pgs.
ClearSpeed: "Introductory Programming Manual—The ClearSpeed Software Development Kit", ClearSpeed Technology Plc., 2007, 78 pages.
ClearSpeed: "Overview of Architecture: System Level (host) Architecture and ClearSpeed Architecture", ClearSpeed Technology Plc., 2007, 50 pages.
ClearSpeed: "Programming Model: Case Study", ClearSpeed Technology Plc., 2007, 56 pages.
ClearSpeed: "Technical Training: Software Development", ClearSpeed Technology Inc., 2007, 114 pges.
Click C., et al., "A Simple Graph-Based Intermediate Representation", ACM IR'95, 1995, pp. 35-49.
Click C., "Global Code Motion Global Value Numbering", ACM Sigplan' 95, pp. 246-257, 1995.
Collard J-F., et al., "Automatic Generation of Data Parallel Code", Proceedings of the Fourth International Workshop on Compilers for Parallel Computers, Dec. 1993, pp. 1-18.
Collard J-F., et al., "Fuzzy Array Dataflow Analysis", In Proceedings of the 5th ACM Sigplan Symposium on Principles and Practice of Parallel Programming, pp. 92-101, Santa Clara, California, Jul. 1995. 10 Pages, URL citeseer.ist.psu.edu/article/collard95fuzzy. html.
Collberg C., et al., "A Taxonomy of Obfuscating Transformations", Technical Report #148, Department of Computer Science, University of Auckland, Jul. 1997. http://www.cs.auckland.ac.nz/-Ccollberg/Research/Publications/CollbergThomborsonLow97a, pp. 1-36.
Collberg C., et al., "Manufacturing Cheap, Resilient, and Stealthy Opaque Constructs", POPL 98, San Diego, CA 1998, pp. 184-196.
Cooper K., et al., "SCC-Based Value Numbering", CRPC-TR95636-S, Oct. 1995, 13 pages.
Cooper K.D., et al., "Operator Strength Reduction", ACM Transactions on Programming Languages and Systems, vol. 23, No. 5, 22 pages, Sep. 2001.
Cousot P., et al., "Abstract Interpretation: A Unified Lattice Model for Static Analysis of Programs by Construction or Approximation of Fixpoints", Conference Record of the Fourth ACM Symposium on Principles of Programming Languages, Jan. 17-19, 1977, 16 pgs.
Cytron R., et al., "Efficiently Computing Static Single Assignment Form and the Control Dependence Graph", Mar. 7, 1991, pp. 1-52.
Darte A., et al., "Automatic Parallelization Based on Multi-Dimensional Scheduling", Research Report No. 94-24, Laboratoire de l'Informatique de Parallelisme, 1994, pp. 1-36.
Darte A., et al., "Scheduling and Automatic Parallelization, Chapter 5: Parallelelism Detection in Nested Loops", Birkhauser Boston, 2000, pp. 193-226.
Darte A., et al., "Lattice-Based Memory Allocation", ACM CASES'03, 2003, pp. 298-308.
Darte A., et al., "Lattice-Based Memory Allocation", IEEE Transactions on Computers, vol. 54, No. 10, Oct. 2005, pp. 1242-1257.
Darte A., et al., "Lattice-Based Memory Allocation", Research Report No. 2004-23, Apr. 2004, 46 pages.
Darte A., et al., "Revisiting the Decomposition of Karp, Miller and Winograd", Parallel Processing Letters, 1995, pp. 13-25.
Davis T.A., "Direct Methods for Sparse Linear Systems". SIAM, 2006 100 pgs.
De Lathauwer L., et al., "On the Best Rank-1 and Rank-(R1,R2, . . . ,RN) Approximation of Higher-Order Tensors", Siam J. Matrix Anal. Appl., vol. 21, Mar. 2000, pp. 1324-1342.
Ezick J., et al., "Alef: A SAT Solver for MPI-Connected Clusters", Technical Report, Aug. 13, 2008, 21 pgs.
Feautrier P., "Array Expansion", Universite de Versailles St-Quentin, Jul. 1988, pp. 1-20.
Feautrier P., "Dataflow Analysis of Array and Scalar References," International Journal of Parallel Programming, vol. 20, No. 1, Sep. 1991, pp. 23-53.
Feautrier P., et al., "Solving Systems of Affine (In)Equalities: PIP's User's Guide", 4th Version, rev. 1.4, Oct. 18, 2003, pp. 1-25.
Feautrier P., "Some Efficient Solutions to the Affine Scheduling Problem, Part II, Multidimensional Time", IBP/MASI, No. 92.78, 1992, pp. 1-28.
Feautrier P., "Parametric Integer Programming" RAIRO Recherche Operationnelle, 22(3): pp. 243-268, 1988, URL citeseer.ist.psu.edu/feautrier88parametric.html.
Feautrier P., "Some Efficient Solutions to the Affine Scheduling Problem Part I. One-Dimensional Time", International Journal of Parallel Programming, vol. 21, No. 5, Received May 1992; Revised Apr. 23, 1993, pp. 313-347, URL: citeseer.ist.psu.edu/feautrier92some.html.
Ferrante J., et al., "The Program Dependence Graph and Its Use in Optimization", ACM Transactions on Programming Languages and Systems, vol. 9, No. 3, Jul. 1987, pp. 319-349.
Franke B., et al., "Compiler Transformation of Pointers to Explicit Array Accesses in DSP Applications", Institute for Computing Systems Architecture (ICSA), University of Edinburgh, 2001, pp. 69-85.
Franzie M., et al., "Efficient Solving of Large Non-Linear Arithmetic Constraint Systems with Complex Boolean Structure", JSAT, Journal on Satisfiability, Boolean Modelling and Computation, vol. 1 (3-4): 2007, pp. 209-236.
George L., et al., "Iterated Register Coalescing", ACM Transactions on Programming Languages and Systems, vol. 18, No. 3, May 1996 pp. 300-324.
Ghosh S, et al., "Cache Miss Equations: A Compiler Framework for Analyzing and Tuning Memory Behavior", ACM Transactions on Programming Languages and Systems, vol. 21, No. 4, Jul. 1999, pp. 702-745.
Griebl M., et al., "Automatic Parallelization of Loop Programs for Distributed Memory Architectures", Fakultat fur Mathematik und Informatik, 207 Pages, Jun. 2, 2004.
Griebl M., et al., "Code Generation in the Polytope Model", pact, pp. 106, Seventh International Conference on Parallel Architectures and Compilation Techniques (PACT'98), 1998, 6 Pages.
Griebl M., et al., "Forward Communication Only Placements and Their Use for Parallel Program Construction", University of Passau, 2002.
Griebl M., et al., "Space-Time Mapping and Tiling: A Helpful Combination", Concurrency and Comput: Pract. Exper. 2004, 16:221-246, 26 Pages.
Griebl M., "On the Mechanical Tiling of Space-Time Mapped Loop Nests", Technical Report MIP-0009, Fakultat fur Mathematik und Informatik, Universitat Passau, Germany, 2000, 15 pages.
Gu J., et al., "Symbolic Array Dataflow Analysis for Array Privatization and Program Parallelization", Proceeding of Supercomputing '95, 1995, pp. 1-19.

(56) References Cited

OTHER PUBLICATIONS

Gundersen G., et al., "Sparsity in Higher Order Methods For Unconstrained Optimization", Optimization Methods and Software, vol. 27, No. 2, 2012, pp. 275-294.
Gupta G., et al., "The Z-Polyhedral Model", SIGPLAN Symp. on Principles and Practice of Parallel Programming, New York, NY, USA, 2007, pp. 237-248.
Gustafson., et al., "ClearSpeed—Whitepaper: Accelerating the Intel. RTM", Math Kernel Library, ClearSpeed Technology Inc., 2006.
Gustavson F.G., "Two Fast Algorithms for Sparse Matrices: Multiplication and Permuted Transposition", ACM Transactions on Mathematical Software, vol. 4, No. 3, 1978, pp. 250-269.
Heintze N., et al., "Ultra-Fast Aliasing Analysis Using CLA: A Million Lines of C Code in a Second", ACM Sigplan Notices, vol. 36, No. 5, 2001, 10 pages.
"Intel® QuickAssist Technology Accelerator Abstraction Layer (AAL)", White Paper, Intel.RTM, Corporation, 2007, 8 pgs.
Irigoin F., et al., "Supernode Partitioning", In Proceedings of the 15th ACM Sigplan—SIGACT Symposium on Principles of programming languages, pp. 319-329, New York, NY, USA, Jan. 1988. ACM Press, ISBN 0-89791-252-7, pp. 1-11.
JGAP Frequently Asked Questions, Sourceforge.net, Accessed 2007, pp. 1-61.
Jimenez M., et al., "Register Tiling in Nonrectangular Iteration Spaces", ACM Transactions on Programming Languages and Systems, vol. 24, No. 4, Jul. 2002, pp. 409-453.
Jonsson B., et al., "Verifying Safety Properties of a Class of Infinite-State Distributed Algorithms", Lecture Notes in Computer Science, vol. 939, 1995, pp. 42-53.
Kandemir M., et al., "Optimizing Spatial Locality in Loop Nests Using Linear Algebra", Proc. 7th International Workshop on Compliers for Parallel Computers, Sweden Jun. 1998, 12 pages.
Kelly W., et al., "Code Generation for Multiple Mappings", Frontiers, Fifth Symposium on the Frontiers of Massively Parallel Computation (Frontiers '95), 1995, pp. 332-341.
Kelly W.A., "Dissertation, Optimization within a Unified Transformation Framework", Dec. 8, 1996, University of Maryland at College Park, pp. 1-89.
Kildall G.A., et al., "A Unified Approach to Global Program Optimization", Annual Symposium on Principles of Programming Languages, Proceedings of the 1st annual ACM Sigact-Sigplan symposium on Principles of programming languages, 1973, pp. 194-206.
Knoop J., et al., "Partial Dead Code Elimination", Conference on Programming Language Design and Implementation, Proceedings of the ACM Sigplan 1994 conference on Programming language design and implementation, 1994, pp. 147-158.
Kodukula I., et al., "An Experimental Evaluation of Tiling and Shacking for Memory Hierarchy Management", ACM ICS'99, 1999, pp. 482-491.
Kolda G., et al., "Scalable Tensor Decompositions for Multiaspect Data Mining", in ICDM 2008: Proceedings of the 8th IEEE International Conference on Data Mining, Dec. 2008, pp. 363-372.
Lam M., "Software Pipeline: An Effective Scheduling Technique for VLIW Machines", Proceedings of the SIGPLAN '88 Conference on Programming Language Design and Implementation, Jun. 22-24, 1988, pp. 318-328.
Landi W., "Undecidability of Static Analysis", From ACM Letters on Programming Languages and Systems, vol. 1, No. 4, 1992, pp. 1-17.
Le Verge H., "A Note on Chernikova's Algorithm", Research Report, Jul. 27, 1994, pp. 1-25.
Lengauer T., et al., "A Fast Algorithm for Finding Dominators in a Flowgraph", ACM Transaction on Programming Languages and Systems, vol. 1, No. 1, Jul. 1979, pp. 121-141.
Lethin., et al., "Mapping Loops for the ClearSpeed Processor Using the R-Stream Compiler", Feb. 4, 2008.
Lethin., et al., "The R-Stream 3.0 Compiler", Dec. 18, 2007.
Lethin., et al., "The R-Stream 3.0 Compiler", Feb. 4, 2008.
Lethin., et al., "The R-Stream 3.0: Polyheadral Mapper", XPCA Review, Feb. 6, 2007.
Lethin R., et al., "Software Tools to Optimize BMD Radar Algorithms to COTS Hardware", Final Report, Sep. 12, 2007.
Lethin R., et al., "R-Stream: A Parametric High Level Compiler", Reservoir Labs, Inc., 2006, 2 pgs.
Lim A.W., et al., "Blocking and Array Contraction Across Arbitrarily Nested Loops Using Affine Partitioning", ACM PPOPP'01, Jun. 18-20, 2001, pp. 1-10.
Lim A.W., et al., "Maximizing Parallelism and Minimizing Synchronization with Affine Transforms", 24th Annual ACM Sigplan-Sigact Symposium on Principles of Programming Languages, Paris, France, Jan. 1997, pp. 201-214.
Lin C-Y., et al., "Efficient Data Compression Methods for Multidimensional Sparse Array Operations Based on the EKMR scheme", IEEE Trans. Comput., vol. 52, No. 12, 2003, pp. 1640-1646.
Lin C-Y., et al., "Efficient Representation Scheme for Multidimensional Array Operations", IEEE Transactions on Computers, vol. 5, No. 3, Mar. 2002, pp. 327-345.
Loechner V., et al., "Precise Data Locality Optimization of Nested Loops", The Journal of Supercomputing, vol. 21, 2002, pp. 37-76.
Mahajan Y.S., et al., "Zchaff2004: An Efficient SAT Solver", LNCS, 2005, pp. 360-375.
Maydan D.E., et al., "Array Data-Flow Analysis and its Use in Array Privatization", POPL '93: Proceedings of the 20th ACM Sigplan-Sigact symposium on Principles of programming languages, Mar. 1993, pp. 2-15.
McWhirter J.G., et al., "Normalised Givens Rotations for Recursive Least Squares Processing", VLSI Signal Processing, VIII, IEEE Signal Processing Society [Workshop on], Sep. 1995, pp. 323-332.
Megiddo N., et al., "Optimal Weighted Loop Fusion for Parallel Programs", ACM Symposium on Parallel Algorithms and Architectures archive Proceedings of the ninth annual ACM symposium on Parallel algorithms and architectures, Jun. 1997, pp. 282-291.
Meister B., "Stating and Manipulating Periodicity in the Polytope Model. Applications to Program Analysis and Optimiazation", Universite Louis Pasteur Strasbourg, Dec. 17, 2004, pp. 1-138.
Meister., et al., "Optimizing and Mapping Tool Chain for FPGA Programming", Final Report Phase 1 SBIR Project, Sep. 28, 2007.
Meister., et al., "Static Software Tools to Optimize BMD Radar Algorithms to COTS Hardware", Quarterly Report #1, 2008, pp. 1-22.
Nieuwenhuis R., et al., "Solving SAT and SAT Modulo Theories: From an Abstract Davis-Putnam-Logemann-Loveland Procedure to DPLL(T)", Journal of the ACM (JACM), JACM, vol. 53, Issue 6, Nov. 2006, pp. 937-977.
Nookala S.P.K., et al., "A Library for Z-Polyhedral Operations", Publication Interne No. 1330, IRISA, Publication No. 1330, May 2000, pp. 1-29.
Pop S., et al., "Fast Recognition of Scalar Evolutions on Three-Address SSA Code", CRI/ENSMP Research Report, A/354/CRI, Apr. 1, 2004, pp. 1-28.
Pop S., et al., "Induction Variable Analysis with Delayed Abstractions", ACM Transactions on Architecture and Code Optimization, vol. V, No. N, pp. 1-30, Aug. 2005.
Pugh W., "The Omega Test: a Fast and Practical Integer Programming Algorithm for Dependence Analysis", ACM, Aug. 1992, 10 pages.
Quillere F., et al., "Generation of Efficient Nested Loops from Polyhedra", 2000 Kluwer Academic Publishers, International Journal of Parallel Programming, vol. 28, No. 5, pp. 469-498, Oct. 2000.
Quillere F., et al., "On Code-Generation in the Polyhedral Model", 2001, 10 Pgs.
Quinton P., et al., "On Manipulating Z-Polyhedra", IRISA, Publication Interne No. 1016, Jul. 1996, 24 Pages.
Quinton P., et al., "The Mapping of Linear Recurrence Equations on Regular Arrays", Journal of VLSI Signal Processing, vol. 1, 35 Pgs, (1989).
Rabinkin D.V., et al., "Adaptive Array Beamforming with Fixed-Point Arithmetic Matrix Inversion using Givens Rotations", Proc. SPIE, vol. 4474, 2001, pp. 294-305.
Rau B.R., "Iterative Modulo scheduling: An Algorithm for Software Pipelining Loops", ACM Micro, 1994, pp. 63-74.

(56) References Cited

OTHER PUBLICATIONS

Schultx, T. "Reconfigurable Application-Specific Computing User's Guide", 2007, pp. 1-257.
Renganarayana L., et al., "A Geometric Programming Framework for Optimal Multi-Level Tiling", Conference on High Performance Networking and Computing, Proceedings of the 2004 ACM/IEEE Conference on Supercomputing, 2004, 14 Pgs.
Reservoir Labs Inc: "Optimizing and Mapping Tool Chain for FPGA Programming", Phase II Proposal, Proposal No. D2-0627, Dec. 2007, 40 Pgs.
Reservoir Labs: "Software Tools to Optimize BMD Radar Algorithms to COTS Hardware", Phase II Proposal Topic No. MDA06-031, Proposal No. B2-1415.
Ros-Giralt J., et al., "Generation of High-Performance Protocol-Aware Analyzers with Applications in Intrusion Detection Systems", Proc. SPIE 7709, Cyber Security, Situation Management, and Impact Assessment II, and Visual Analytics for Homeland Defense and Security II, 770909 (Apr. 28, 2010), 8 Pgs.
Ros-Girolt, et al., "Compilation and Optimization of Protocol Analyzers for High-Speed Network Intrusion Prevention", High Performance Networks / High-Speed Network Security Systems, Topic No. 41b, Reservoir Labs, Inc. 2009, pp. 1-54.
Sankaralingam K., et al., "Distributed Microarchitectural Protocols in the TRIPS Prototype Processor", International Symposium on Microarchitecture, Proceedings of the 39th Annual IEEE/ACM International symposium on Microarchitecture, 2006, 12 Pgs.
Saranli A., et al., "A Statistical Unified Framework for Rank-Based Multiple Classifier Decision Combination", Pattern Recognition, vol. 34, Apr. 2001, pp. 865-884.
Schreiber R., et al., "Near-Optimal Allocation of Local Memory Arrays", HP Laboratories Palo Alto, HPL-2004-24, Feb. 17, 2004, pp. 1-23.
Schwartz D.A., et al., "VSIPL 1.1 API", 2002, pp. 1-739.
Seghir R., et al., "Counting Points in Integer Affine Transformation of Parametric Z-Polytopes", Research Report, Universite Louis Pasteur, LSIIT (UMR CNRS 7005), Mar. 2007, pp. 1-24.
Seghir R., et al., "Memory Optimization by Counting Points in Integer Transformation of Parametric Polytopes", ACM CASES'06, 2006, pp. 74-82.
Simpson L.T., "Thesis, Value-Driven Redundancy Elimination", Rice University, 1996, pp. 1-150.
Song Y., et al., "A Compiler Framework for Tiling Imperfectly-Nested Loops", Languages and Compilers for Parallel Computing, vol. 1863, 2000, pp. 1-17.
Springer, et al., "An Architecture for Software Obfuscation", PowerPoint presentation, 2007.
Springer, et al., "An Architecture for Software Obfuscation—Final Technical Report for Phase 1 SBIR", Jul. 30, 2007.
PPCNUX, "The Cell Roadmap", Published on PPCNUX at http://www.ppcnux.com/?q=print/6666, Accessed 2006.
The Polylib Team, "Polylib User's Manual", Apr. 24, 2002, pp. 1-44.
Touati S.A.A., et al., "Early Control of Register Pressure for Software Pipelined Loops", In Proceedings of the International Conference on Compiler Construction (CC), Warsaw, Poland, Apr. 2003, Springer-Verlag, 15 Pgs.
Tu P., et al., "Automatic Array Privatization", Lecture Notes in Computer Science, vol. 1808, 2001, 22 pgs.
Tu P., "Thesis, Automatic Array Privatization and Demand-Driven Symbolic Analysis", University of Illinois, 1995, pp. 1-144.
Udupa S.K., et al., "Deobfuscation—Reverse Engineering Obfuscated Code", Proceedings of the 12th Working Conference on Reverse Engineering (WCRE'05), 10 Pgs. 2005.
Vangal S., et al., "An 80-Tile 1.28TFLOPS Network-on-Chip in 65Nm CMOS", ISSCC 2007, Session 5, Microprocessors/5.2, 3 Pgs.
Vasilache, et al., "Alef: A SAT Solver for MPI-Connected Clusters", Reservoir Labs, Mar. 2009, 6 Pgs.
Vasilache N., et al., "Polyhedral Code Generation in the Real World", Compiler Construction, vol. 3923, 2006, 15 Pgs.
Vasilache N.T., "Scalable Program Optimization Techniques in the Polyhedral Model", Thesis, Universite de Paris-SUD, UFR Scientifique d'orsay Inria Futures, Sep. 28, 2007.
Vera X., et al., "An Accurate Cost Model for Guiding Data Locality Transformations", Politecnica de Catalunya-Barcelona University, ACM Transactions on Programming Languages and Systems, vol. 27, No. 5, Sep. 2005, 43 Pages.
Verdoolaege S., et al., "Counting Integer Points in Parametric Polytopes using Barvinkok's Rational Functions", Algorithmica, 2007, pp. 1-33.
Wang C., "Dissertation—A Security Architecture for Survivability Mechanisms", University of Virginia, 2000, pp. 1-209.
Wegman M., et al., "Constant Propagation with Conditional Branches", ACM Transactions on Programming Languages and Systems, vol. 13, No. 2, Apr. 1991, pp. 181-210.
Weise D., et al., "Value Dependence Graphs: Representation without Taxation", Annual Symposium on Principles of Programming Languages, Proceedings of the 21st ACM Sigplan-Sigact symposium on Principles of programming languages, Jan. 1994, pp. 297-310.
Whaley J., et al., "An Efficient Inclusion-Based Points-To Analysis for Strictly-Typed Languages", Lecture Notes in Computer Science, vol. 2477, 2002, 16 page.
Wilde D.K., "A Library for Doing Polyhedral Operations", IRISA, Publication No. 785, Dec. 1993, pp. 1-48.
Wolf M.E., et al., "A Data Locality Optimizing Algorithm", Proceedings of the ACM Sigplan '91 Conference on Programming Language Design and Implementation, Jun. 26-28, 1991, pp. 30-44.
Wu Y., et al., "Static Branch Frequency and Program Profile Analysis", 27th IEEE/ACM International Symposium on Microarchitecture (MICRO-27), Nov. 1994, 11 pages.
Xu L., et al., "Hydra: Automatically Configuring Algorithms for Portfolio-Based Selection", Jul. 2010, Twenty-Fourth AAAI Conference on Artificial Intelligence, pp. 210-216.
Xue J., et al., "Enabling Loop Fusion and Tiling for Cache Performance by Fixing Fusion-Preventing Data Dependences", Proceedings of the 2005 International Conference on Parallel Processing (ICPP'05), 2005, pp. 1-9.
Xue J., "On Tiling as a Loop Transformation", Department of Mathematics, Statistics and Computing Science, University of New England, Australia, 1997, 15 pages.
Zhang X., et al., "An Ensemble Architecture for Learning Complex Problem-Solving Techniques from Demonstration", Sep. 2012, ACM Transactions on Intelligent Systems and Technology, vol. 3, No. 4, Article 75, pp. 75:1-75:38.
Zhu D., "A Hybrid Approach for Efficient Ensembles", Decision Support Systems, vol. 48, 2010, pp. 480-487.

SYSTEM AND METHOD FOR CONFIGURATION OF AN ENSEMBLE SOLVER

CROSS REFERENCE TO RELATED APPLICATIONS

This is a continuation of U.S. patent application Ser. No. 15/617,602, entitled "System And Method for Configuration of an Ensemble Solver," filed on Jun. 8, 2017, now U.S. Pat. No. 10,839,297, which is a divisional of U.S. patent application Ser. No. 13/910,467, entitled "System and Method for Configuration of an Ensemble Solver," filed on Jun. 5, 2013, now U.S. Pat. No. 9,684,865, which claims the benefit of and priority to U.S. Provisional Patent Application No. 61/655,965, entitled "Method of Using Machine Learning to Drive Adaptive Ensemble Configuration in a Constraint Solver," filed on Jun. 5, 2012, the disclosures of which are hereby incorporated by reference in their entireties.

GOVERNMENT INTERESTS

This invention was made with U.S. Government support under Contract No. W9113M-10-C-0089 awarded by the U.S. Army Space & Missile Defense Command/ARSTRAT, and under Contract No. W91CRB-11-C-0087 awarded by the Army Contracting Command Aberdeen Proving Ground/ DARPA. The government has certain rights in the invention.

FIELD OF THE INVENTION

The present invention generally concerns mathematical solvers. More particularly, the present invention concerns a system and method for configuring an ensemble of solvers so as to efficiently solve and/or determine solvability of a constraint problem.

BACKGROUND OF THE INVENTION

A constraint solver is generally understood as a process, or a processor adapted to execute a process, that accepts as input a system of constraints including one or more constraints over one or more variables, and returns an assignment of values to those variables, if one exists, such that all of the constraints are satisfied. If no such assignment of variables exists, the process determines that the constraint system is unsatisfiable, i.e., the process determines that there is no set of values that can be assigned to the variables such that all constraints are satisfied. In general, "solving" a constraint problem includes either determining whether a constraint-satisfying assignment exists, or finding such an assignment, or both.

The set of possible assignments, i.e., the several combinations of values that can be assigned to the constraint system variables, generally describes a search space over which the constraint solver process/algorithm executes. If the number of constraint variables and/or the number of constraints in the constraint system are large, the theoretical search space, i.e., the set of each and every combination of values that can be assigned to all the variables, can become very large. Such a constraint problem may be intractable, i.e., even a large computer or a number solvers operating together may not be able to solve the problem in a reasonable time (e.g., minutes, hours, or even days), and/or may run out of memory while solving the problem.

A typical constraint solver includes several adjustable parameters. Generally, one or more of these parameters can be tuned or adjusted to affect the manner (e.g., order) in which the solver/algorithm searches the space of possible assignments. Thus, by appropriately selecting the parameter values, the overall search space can be explored efficiently in order to find a solution. A choice of values for the parameters of a solver is commonly referred to as a configuration for the constraint solver.

An ensemble of constraint solvers includes several constraint-solver instances (nodes), running concurrently, attempting to find a satisfying assignment to a specified system of constraints. All of the constraint solvers in the ensemble may terminate once any of the solvers either finds a satisfying assignment to the variables of the constraint system or determines that the constraint problem is unsatisfiable. The coordinated start and termination of the ensemble solvers can be handled by a designated master process. An ensemble can include as few as two solvers, but typically includes a large number of solvers, e.g., 100 or 1000 solvers.

Generally, the solvers in the ensemble are either different algorithms accepting the same input, or differently configured versions of the same algorithm. The individual constraint solvers that form an ensemble may or may not share information with each other, e.g., about an area of the search space that a solver has already explored. Whether or not such information is shared, if different solvers simultaneously search different areas of the overall search space corresponding to a problem to be solved, an ensemble can operate faster than a single constraint solver configured to solved that problem. The different solvers can be adapted by assigning different configurations thereto such that one or more corresponding parameters of different solvers are assigned different values. The solvers thus configured can search different areas of the overall search space in different orders so that at least one of the solvers may explore the area that includes a solution to the problem relatively early. Thus the ensemble may find the solution faster than a single solver. This performance benefit can diminish, however, if one or more solvers initially explore search areas in which the solution is unlikely to be found or if several solvers explore the search space in substantially the same manner. As such, some techniques that can be used to configure only a single solver are not useful in configuring an ensemble of solvers such that the overall search space can be explored in an efficient manner.

Therefore, there is a need for a system and/or method that can configure a number of solvers in an ensemble according to a constraint problem to be solved. There is also a need to be able to readjust the configurations for one or more solvers in the ensemble as the solvers attempt to find the solution, such that the likelihood of finding a solution may be increased and/or the time required to find the solution may be decreased.

SUMMARY OF THE INVENTION

Various embodiments of the present invention enable configuration of an ensemble such that the several solvers in the ensemble can efficiently explore the search space corresponding to a constraint problem to be solved. Specifically, various embodiments can be used to configure different solvers in such a manner that the different solvers can simultaneously explore different areas of the overall search space while minimizing the risk that one or more solvers searches for a solution to the constraint problem in an area in which the solution is not likely to be found. This is achieved, in part, by generating a number of distinct candidate configurations that may be assigned to one or more solvers, and by computing an array of scores for each candidate configuration. Each array of configuration scores is based on arrays of scores assigned to the options assigned to the parameters of each candidate configuration.

Based on, at least in part, a comparison of the arrays of configuration scores, a determination is made whether to assign a certain candidate configuration to any solver. In some cases, a certain candidate configuration may be assigned to more than one solver. The difference in the configuration scores of two candidate configurations indicates that solvers configured according to those two candidates are likely to search different areas of the overall search space. The score value can be indicative of a relative probability that a solver according to a certain candidate configuration can find a solution in a specified amount of time. Thus, the assignment of candidate configurations based on, at least in part, the arrays of scores can increase the likelihood that different areas of the overall search space are explored while mitigating the risk of searching areas in which a solution is not likely to be found. This can maximize the efficiency of solving the constraint problem using an ensemble.

Various embodiments also facilitate changing the configuration of one or more solver nodes within an ensemble after the solution process has started in response to information derived from the solution process. This can further increase the efficiency of exploring the search space in finding a solution. The various embodiments of the ensemble configuration system and method described herein can be used to configure ensembles used for solving many different types of problems such as resource allocation, planning, graph analytics, hardware and software verification, etc.

Accordingly, in one aspect, various embodiments feature an article of manufacture that includes instructions to configure a processor, a method, and/or a system that enables configuration of an ensemble of several solvers such that the ensemble can efficiently explore the search space corresponding to a constraint problem. The system includes a memory, and a processor in electronic communication with the memory. The processor is configured according to the system configuration, or by the instructions included in the article of manufacture. The method and the processor as configured compute, for each candidate configuration within a number of candidate configurations, an array of aggregate scores. The array corresponds to a statistical parameter corresponding to a solution to a problem to be solved. The computation is based on, at least in part, a first set of features stored in memory, and the first set of features is associated with the problem to be solved by the ensemble. The method and the processor as configured assign to a first solver among the several solvers of the ensemble a first candidate configuration selected from the various candidate configurations. The assignment is based on, at least in part, the computed arrays of aggregate scores.

To compute the array of aggregate scores the method and the processor as configured may further apply a machine learning (ML) procedure to the first set of features. In some embodiments, the method and the processor as configured further assign to a second solver among the several solvers of the ensemble a second candidate configuration that is also selected from the number of candidate configurations. The selection of the second candidate configuration may be based on, at least in part, the computed arrays of aggregate scores. The second candidate configuration may be the same as the first candidate configuration. In other words, two solvers in the ensemble may have the same configuration.

In some embodiments, the method and the processor as configured further select a set of candidate configurations from the several candidate configurations based on, at least in part, the computed arrays of aggregate scores. The selected set of candidate configurations may include the first candidate configuration and the second candidate configuration. Configurations for other solvers in the ensemble may be selected from this set as opposed to selecting them from all of the candidate configurations.

In some embodiments, each candidate configuration includes a set of configuration parameters. A value for each configuration parameter can be selected from one or more options. For each candidate configuration, to compute an aggregate score in the array of aggregate scores, the method and the processor as configured further assign an option score to each configuration parameter based on, at least in part, an option value designated to the configuration parameter. Computation of the aggregate score may include a linear summation, which can be weighted or unweighted, of the option scores assigned to the configuration parameters. For each element in the array of aggregate scores, the option scores from the corresponding elements in the arrays of option scores are used in this computation.

The method and the processor as configured may generate the several candidate configurations from which configurations are selected and assigned to the various solvers of the ensemble. To this end, the method and the processor as configured further designate a first option to a first configuration parameter of the first candidate configuration, and designate a second option to the first configuration parameter of another candidate configuration. In general, the method and the configured processor may create a copy of a configuration in which all parameters are initially unassigned. Then, the method/configured processor may select an option value for each parameter. If the combination of the option values assigned is unique, a new configuration is created. A new configuration can also be created by copying an existing configuration and changing the option values of one or more parameters such that the combination of the modified options values is unique.

A configuration parameter from the set of configuration parameters can be a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, or size of information to be shared between two solvers. A configuration parameter can also be a combination parameter that includes a combination of two or more of the above described parameters.

In some embodiments, the array of aggregate scores computed for the first candidate configuration includes a first aggregate score and a second aggregate score. The second aggregate score may be based on, at least in part, a distribution range associated with the statistical parameter that is associated with the problem to be solved. For example, the distribution range may be a range of expected times to solve the problem. The second aggregate score may represent a beneficial value of assigning a copy of the first candidate configuration to a solver in the ensemble. As such, the method and the processor as configured may further assign to a second solver, among the several solvers of the ensemble, the first candidate configuration based on, at least in part, the second aggregate score in the array of scores.

In some embodiments, the various solvers in the ensemble include a number of Boolean satisfiability solvers, and the processor and the processor as configured further assign to the first and second solvers first and second seeds, respectively. The second seed can be different than the first seed. The configuration of the solvers assigned to the first and second solvers may be the same. Alternatively, the method and the processor as configured may further assign to a second solver among the number of solvers of the ensemble a second candidate configuration that is both: (i) different than the first candidate configuration, and (ii) selected from the several of candidate configurations. The second candidate configuration is selected based on, at least in part, the second aggregate score in the array of scores computed for the first candidate configuration. In this case, the second aggregate score indicates that the benefit of copying the first candidate configuration is not as great as using a different, second configuration.

In some embodiments, to compute the array of aggregate scores the method and the processor as configured analyze: (i) the several candidate solver configurations, (ii) a second set of features, (iii) training data associating the several candidate solver configurations and the second set of features, and (iv) the first set of features. The training data correspond to a solution by the ensemble using the several candidate configurations, to a different problem than the problem to be solved. That problem is characterized by the second set of features. Using the training data and the first set of features, the aggregated scores for various candidate configurations, if used to solve the problem to be solved, can be computed. The problem to be solved may include a constraint satisfaction problem.

In some embodiments, the method and the processor as configured further statically derive the first set of features associated with the problem to be solved. These features are based on the problem to be solved. The statistical parameter related to the problem to be solved may include an expected time required to find the solution to the problem.

In some embodiments, the method and the processor as configured further receive in memory runtime data associated with the set of configurations assigned to the ensemble. The runtime data are received from at least a subset of solvers in the ensemble. The method and the processor as configured further apply a heuristic analysis procedure and/ or another machine learning procedure to the runtime data, so as to update an aggregate score in an array of aggregate scores associated with the first candidate configuration that is assigned to the first solver. The method and the processor as configured may further update, based on the updated aggregate score, a score for an option designated to a configuration parameter of the first candidate configuration. The method and the processor as configured may also update, based on the updated score of the option, an option score for another candidate configuration in which a corresponding configuration parameter is also designated the option designated to the configuration parameter of the first candidate configuration. Moreover, the method and the processor as configured may update an aggregate score for the other candidate configuration based on, at least in part, the updated option score for the other candidate configuration. Thus, based on the runtime data the option score for a certain option value may be updated. Then, for any candidate configuration in which a corresponding parameter is assigned that option value, the corresponding options scores and the aggregate scores may also be updated, to reflect the information learned from the runtime data.

In another aspect, various embodiments feature an article of manufacture that includes instructions to configure a processor, a method, and/or a system that enables configuration of an ensemble of several solvers such that the ensemble can efficiently explore the search space corresponding to a constraint problem. The system includes a memory, and a processor in electronic communication with the memory. The processor is configured according to the system configuration, or by the instructions included in the article of manufacture. The method and the processor as configured receive from at least a subset of solvers in the ensemble runtime data associated with a first set of configurations currently assigned to the solvers in the ensemble. A machine learning procedure and/or a heuristic analysis procedure is applied to the runtime data to determine a new configuration to be assigned to a first solver in the ensemble. The new configuration is different than a configuration in the first set that is currently assigned to the first solver. The method and the processor as configured assign the new configuration to the first solver. In other words, the current configuration assigned to at least one of the solvers in the ensemble is updated based on the runtime data.

To assign the new configuration, the method and the processor as configured may adjust a configuration parameter of the first solver according to the new configuration without stopping the first solver. Alternatively, to assign the new configuration, the method and the processor as configured may stop the first solver, change a configuration parameter of the first solver according to the new configuration after stopping the first solver, and then restart the first solver.

In some embodiments, the method and the processor as configured further identify based on, at least in part, the runtime data a second solver in the ensemble performing at least at a preselected threshold. The configuration assigned to the second solver may be assigned to one or more other solvers in the ensemble. Thus, to determine the new configuration the method and the processor as configured may adjust a parameter of the new configuration according to a corresponding parameter of a configuration, from the first set, that is currently assigned to the second solver.

In some embodiments, the several solvers in the ensemble include a number of Boolean satisfiability solvers. The method and the processor as configured further associate a new seed with the first solver to which the new configuration is assigned. To determine the new configuration, the method and the processor as configured may copy each parameter of the new configuration from a corresponding parameter of a configuration, from the first set, that is currently assigned to the second solver. Thus, the first and second solvers may be assigned the same configuration but different seeds. In some embodiments, the method and the processor as configured further identify based on, at least in part, the runtime data a third solver in the ensemble performing below a preselected threshold. The third solver is designated as the first solver that is to be assigned the new configuration. Thus, configuration of a solver performing below a selected threshold can be updated.

The runtime data may include one or more of a depth of a solver decision stack, a duration for which the decision stack is at a specified depth, an average number of implications per decision, an implication fan out degree for a variable, an average length of an implication sequence, a maximum length of an implication sequence, and an average size of conflict clauses. At least one parameter of the new configuration may be a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, or size of information to be shared between two solvers. A parameter of the new configuration may also include a combination of two or more of the above listed individual parameters.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
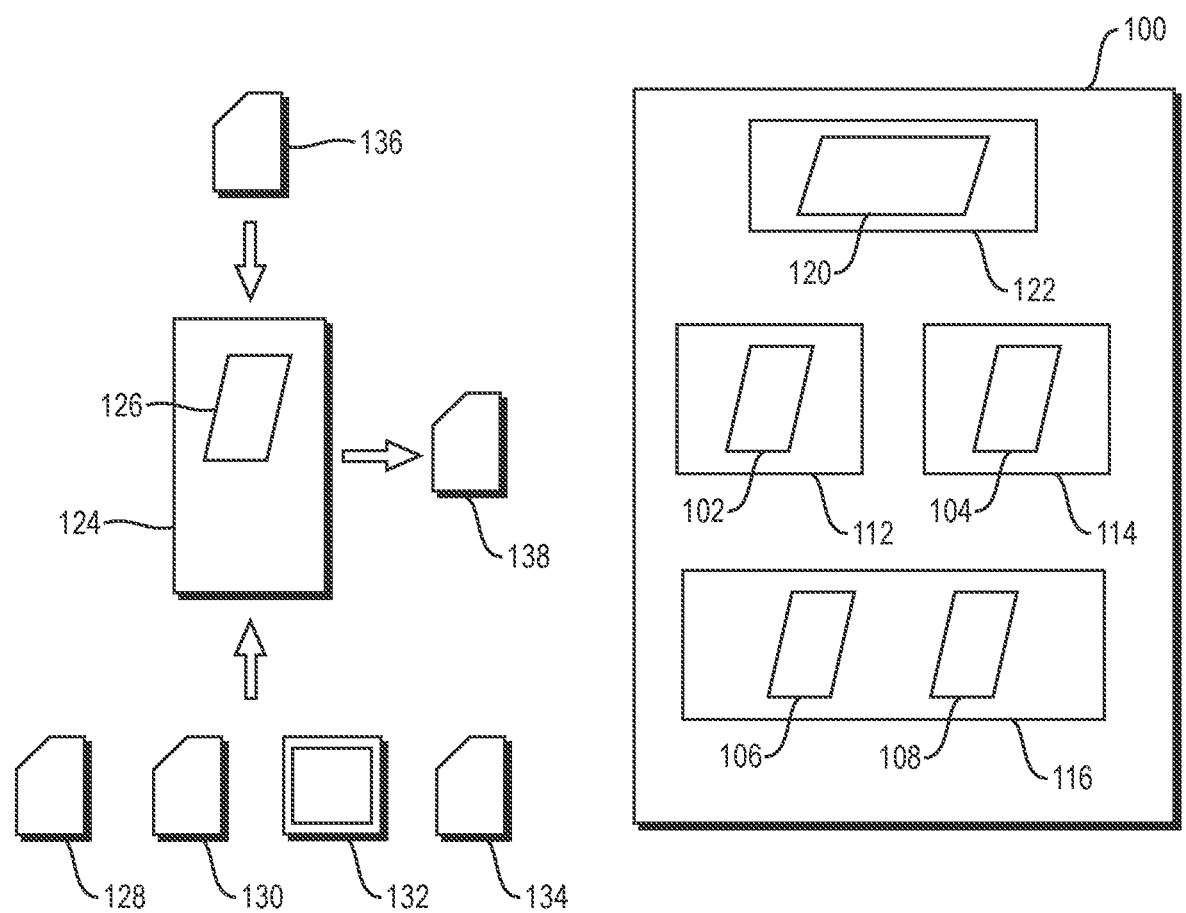
FIG. 1 depicts an ensemble to be configured, and an ensemble configuration system, according to one embodiment.

With reference to FIG. 1, an ensemble 100 includes solvers 102, 104, 106, 108 and a master process 120. It should be understood that the number of solvers is illustrative only and that an ensemble may include as few as two and as many has tens, hundreds, or thousands of solvers. Some ensembles may not include a master process. A processor 112 is adapted to function as the solver 102 and a processor 114 is adapted to function as the solver 104. A multi-processor computer 116 is adapted to function as two individual solvers, namely, the solvers 106, 108. In some embodiments, each solver is implemented or provided by a distinct processor, while in other embodiments, one computer (e.g., a single processor, a multi-processor system, a server, etc.) is adapted to provide the functionalities of two or more individual solvers.

In the ensemble 100, each of the solvers 102-108 can communicate information about the solver's run, i.e., information about the solver's attempt to solve the constraint problem up to a certain time, with a master process 120 which is implemented by a processor 122. The master process 120 can process and share the information received from one solver (e.g., the solver 102) with the other solvers (e.g., the solvers 104-108). In some embodiments, a master process may share the received information with only some of the solvers in the ensemble, and in some embodiments the master process may not share the information with any solver. Instead, the received information may be used to select configurations of one of more solvers.

FIG. 1 also depicts a processor 124 that is adapted to execute an ensemble configuration process 126 that assigns configurations to the solvers 102-108. The process 126 can receive information about the constraint problem to be solved 128, a previously solved constraint problem 130, such as a training problem, an ensemble configuration 132, i.e., configurations of the solvers 102-108 used to solve the problem 130, and runtime data 134 obtained while solving the problem 130 (e.g., training data). The ensemble configuration process 126 can optionally receive additional runtime data 136 as the ensemble 100 attempts to solve the current problem 128. These runtime data may be obtained from the master process 120 and/or directly from one or more individual solvers 102-108. In some embodiments, a processor used to implement one or more of the individual solvers can also implement the master process 120, the ensemble configuration process 126, or both.

The ensemble configuration process 126 can extract observable characteristics or features 138 of the problem to be solved and may use the extracted features in determining candidate configurations and scores associated therewith. Various machine learning (ML) algorithms that can determine candidate configurations and/or scores based on the extracted features may be incorporated into the process 126. In particular, using a machine learning algorithm the process can compute the arrays of scores according to a statistical parameter associated with the problem to be solved. For example, the ML algorithm can assign scores to an option and/or a candidate configuration based on the expected time to solve the problem.

Figure 2:
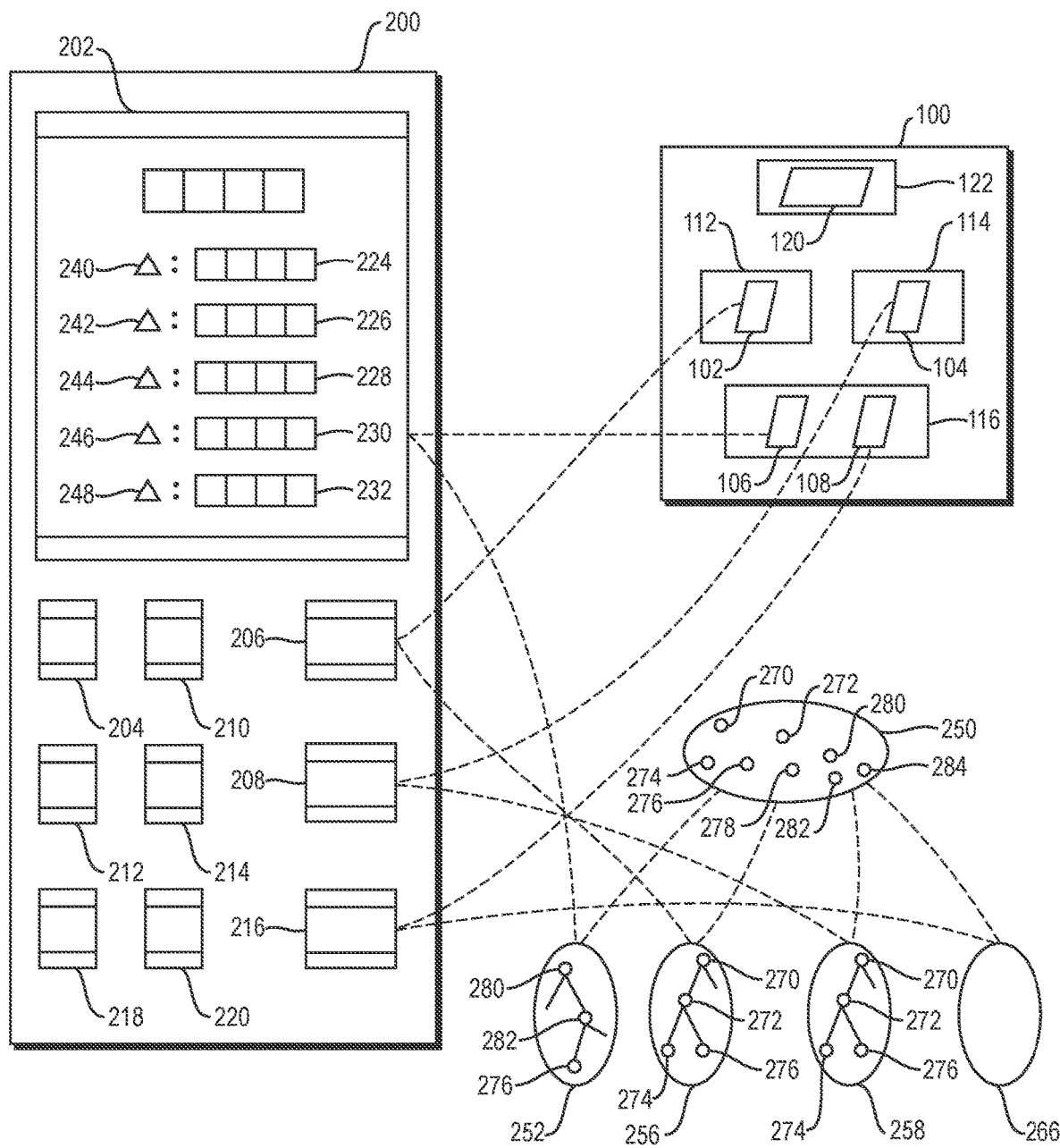
FIG. 2 schematically illustrates candidate configurations, a search space corresponding to a problem to be solved an exemplary mapping of candidate configurations to solvers of an ensemble, according to one embodiment.

FIG. 2 schematically depicts a set 200 of ten candidate configurations, i.e., candidate configurations 202 through 220, that are considered by the ensemble configuration process 126. An ensemble configuration process, in general, may generate and consider as few as two and as many as tens, hundreds, or thousands of candidate configurations. Each candidate configuration includes an array of aggregate scores, and arrays of option scores. An array of option scores may be associated with a parameter of the candidate configuration. In the embodiment illustrated with reference to FIG. 2, each of the candidate configurations 202-220 includes five parameters. Each parameter can be assigned a value selected from one or more options. In general a candidate configuration may include fewer or more parameters than can be adjusted, and the number of options available for different parameters can be different.

For the sake of clarity, FIG. 2 depicts the arrays scores associated with only the candidate configuration 202, though such arrays are associated with the other candidate configurations 204-220 as well. Specifically, an array 222 includes four elements, and each element holds an aggregate score associated with the candidate configuration 202. In general, there may be as many elements in each array as the number of solvers in the ensemble. Option score arrays 224 through 232 respectively correspond to the choice of an option for each of the parameters 240 through 248 of the candidate configuration 202. Each option score array also includes four elements because the exemplary ensemble 100 includes four solvers.

A solver configured according to a certain configuration may explore various areas of the overall search space 250 corresponding to the problem to be solved in a specific order, as determined by the solver's configuration. In one embodiment, Configuration 3, 206, is assigned to solver 102; Configuration 4, 208, is assigned to solver 104; Configuration 1, 202, is assigned to solver 106; and Configuration 8, 216, is assigned to solver 108. Accordingly, the solver 102 may explore the search space 250 in Order 3, 256, while the solver 104 may explore the space 250 in Order 4, 258. The solvers 106, 108 may explore the space 250 in Order 1, 252, and Order 8, 266, respectively. A selection of the search order may include a selection of an order in which the constraint variables are assigned values during exploration and/or an order of different values that may be assigned to those variables. The configurations may be selected such that the different orders of areas searched by the solvers are non-overlapping or are partially overlapping. The search orders according to the assigned or candidate configurations may cover the entire search space.

With reference to FIG. 2, the search orders 256, 258 are similar to each other in that the solvers 102, 104 may apply similar methods to explore solutions to the problem, e.g., by making the same non-random decisions. To illustrate, both solvers 102, 104 start by exploring search area 270 and then explore search area 272. Thereafter, however, the solver 102 explores the area 274 while the solver 104 explores the area 276. The solver 102 may subsequently search the area 276 and the solver 104 may later search the area 274. The search order 252 is significantly different from the search orders 256, 258, and as such, the solver 106 is likely to initially explore solutions that are substantially dissimilar to those initially explored by the solvers 102, 104. For example, the solver 106 may start with search area 280, then proceed to search area 282 before exploring the search area 276 that may be explored by the solves 102, 104. The solver 108 may explore the search space 250 in yet another order 266.

The ensemble configuration processes determines the scores in the arrays of scores, and these scores are indicative of relative costs (e.g., computation costs) and benefits of exploring the overall search space in a particular order. In some cases, the constraint solver includes a random seed that also affects the order in which the search space is explored. The array of scores associated with a configuration are indicative of the benefit of mapping multiple copies of a configuration, with different random seeds, to different solvers in the ensemble. Intuitively, the score in array index i indicates the benefit associated with the i-th copy of the configuration. The greater the learned expected variability in the performance of the configuration, the slower the benefit scores tend to decrease across the array. Therefore, an assignment of configurations based on the arrays of scores can result in an ensemble configuration that can simultaneously search different areas/portions of the search space if a solution is likely to be found in any of those areas, while initially avoiding the areas in which a solution is not likely to be found. These areas may be searched, but after the areas that are likely to include a solution. The ensemble so configured can solve the problem faster than a single solver. Thus, selecting various search orders based on the computed arrays of scores can unlock the potential benefit of using an ensemble to solve the constraint problem faster than using a single solver.

Ensemble Configuration Selection

Given an ensemble of solvers, S1 ... Sn, the goal is to assign to each solver a configuration. In one embodiment, each solver has a set of parameters, P1 ... Pm. Each parameter can be assigned a choice of value from among one or more options. For each parameter, the set of options is a finite set, although the number of options may vary for each parameter. The number of options for different parameters can be the same, or can be different for different parameters. A configuration is a set that assigns to each parameter of the solver exactly one option from the set of options associated with that parameter. An ensemble configuration is then the assignment of a configuration to each solver in the ensemble. In one embodiment, a single configuration may be assigned to more than solver in an ensemble. The parameters of a solver include but are not limited to a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, and size of information to be shared between two solvers.

Configuration of an Entire Ensemble

The process assigning an entire ensemble works by assigning an array of scores to each option. A score is a real value (positive, negative, or zero). The length of the array of scores is equal to the number of solvers in the ensemble. The array of scores for each option is derived from the feature set of the problem being solved (that is, the score arrays vary from problem to problem). From these score arrays, the array of scores for a configuration is the linearly weighed (element-wise) sum of the array score for the options assigned to the parameters that comprise the configuration.

Example

Consider an ensemble of two solvers: S1, S2. Each solver configuration includes two adjustable parameters. Parameter 1 is restart frequency, and the options for Parameter 1 are 100, 500, 1000. The corresponding option scores for Parameter 1 are as follows:

100: [50 40]
500: [70 60]
1000: [100 80]

The second parameter, Parameter 2, is use conflict clause minimization, and the options for Parameter 2 are true and false, indicating whether conflict clause minimization is employed by the solver. The option scores for Parameter 2 are:

true: [40 20]
false: [60 10]

Based on these parameters and options, an exemplary candidate configuration can be described as {Parameter 1=500, Parameter 2=false} or as {500, false}. The aggregate score for this candidate configuration is given by:

$$A1*[70\ 60]+A2*[60\ 10]$$

where A1 and A2 are tuning coefficients or weights associated with Parameter 1 and Parameter 2, respectively. Without the loss of generality, if A1=A2=1, the aggregate score for the candidate configuration {500, false} is [130 70].

In this example, there are six possible candidate configurations, each with a corresponding array of scores as shown below.

C1: {100, true}=[90 60]
C2: {100, false}=[110 50]
C3: {500, true}=[110 80]
C4: {500, false}=[130 70]
C5: {1000, true}=[140 100]
C6: {1000, false}=[160 90]

Given the score array for each possible candidate configuration, C1 ... Ck, the ensemble selection process proceeds as follows. Without the loss of generality, assume score arrays are indexed from 1.

Initially, let Ci_index=1 for each configuration (i=1 ... k)

Let Score[Ci]=the score for configuration Ci at array index Ci_index. For each solver, Sj, (j=1 ... n), assign to Sj the configuration Ci with the highest value of Score[Ci] and then increment Ci_index for that configuration. Intuitively, the array index captures the value or benefit of assigning multiple copies of a certain configuration to different solvers in the ensemble. For example, solver S1 would be assigned the configuration C6 because initially, when Ci_index=1 for all i, the first element of the array of aggregate scores associated with the candidate configuration C6 is the maximum score. C6_index is then incremented to 2, while indices for the other candidate configurations remain at 1. Therefore, the solver S2 would be assigned the configuration C5, because C6_index is now 2, and C5[1]=140 is greater than C6[2], which is equal to 90. In general, this process assigns to each solver in the ensemble exactly one configuration.

In another embodiment, each solver configuration includes two adjustable parameters as in the Example above, but Parameter 1 is a combination parameter. Specifically, Parameter 1 is a combination of the individual parameters, namely, restart frequency and decision heuristic. It should be understood that this combination is illustrative only and that other combinations including additional individual parameters and combinations of two or more different parameters are contemplated in various embodiments. By combining two or more individual parameters into a single combination parameter, the ensemble configuration process can take into account any correlation that may exist between the individual parameters that are combined. The options associated with a combination parameter include tuples of options instead of individual options. Correspondingly, each element of the array of option scores associated with a combination parameter includes a single score related to the combined choice of the parameters in the tuple.

One method for assigning the score arrays to the options is to use a machine learning algorithm on a training set of problems and configurations. In one embodiment, the training data that associate a constraint problem instance, an ensemble configuration, and a time-to-solution are parsed. A machine learning method can use the parsed data to generate a quantitative ranking (e.g., based on lowest expected time-to-solution) of solver configurations for a specific, previously unseen, constraint problem instance, e.g., the problem to be solved. To this end, from an analysis of the training data, a model is constructed that maps the feature set of the problem being solved to an array of scores for each option. The ensemble configuration process may extract the feature set from a specification of the problem to be solved.

Dynamic Reconfiguration of an Ensemble

In one embodiment, as the solvers in the ensemble run, they communicate information back to the ensemble configuration process. That information can be used to adjust/update the array scores associated with options represented in the configuration from which the information was sent. Periodically, the arrays of scores in the candidate set of configurations may be adjusted according to the updated scores.

In general, information from a solver in the ensemble running with the configuration Ci may cause the aggregate configuration score for Ci to be changed (increased or decreased) by a quantity Delta. Based on this update, the option score arrays and the aggregate score arrays associated with different candidate configurations are updated as follows:

Let $A = A1 + \ldots + Am$, where A1, A2, ..., Am are the weights associated with each parameter of the configuration. In this example, m=2 as there are two parameters, and A=2 because A1=A2=1.

For each option, Oj (j=1 ... m), assigned to a parameter in a candidate configuration Ci, multiply each score in array associated with Oj the quantity (Ci[1]+Delta*Ai/A)/Ci[1]. For example, if the ensemble configuration process receives information from a solver running the configuration C5={1000, true} that results in a change of Delta=+20 for that configuration, the new (updated) score arrays may be computed as follows:

$$\text{Parameter 1, Option 1000} = [100 \ \ 80] * ((100 + 20 * 1/2)/100$$
$$= [100 \ \ 80] * 1.1 = [110 \ \ 88]$$
$$\text{Parameter 2, Option true} = [40 \ \ 20] * ((40 + 20 * 1/2)/40$$
$$= [40 \ \ 20] * 1.25 = [50 \ \ 25]$$

Periodically, the set of candidate configurations assigned to the ensemble is updated using the revised scores. The method for determining the updated configuration assignments is substantially the same as that described earlier. In one embodiment, the ensemble is adjusted by changing parameters while the solvers are running, without stopping, updating the parameters, and then restarting the solver, where possible. The solver includes a process of finding a solution, and that process can simply use the updated parameter value during subsequent processing by the updated solver. Specifically, a solver typically includes an iterative process in which each iteration corresponds to the exploration of a branch in the search space. Some configuration parameters (e.g., frequency of restarts) can be modified between iterations without causing a disruption in the execution state of the algorithm. Thus, a solver can be reconfigured/tuned dynamically as it is running. In some instances, the solver is stopped, the configuration thereof is updated, and then the solver is restarted with the newly selected configuration.

In the context of an ensemble, a single solver node can be retired (terminated) and replaced with a solver having a different configuration without affecting the function of the ensemble as a whole, e.g., while other solvers in the ensemble are running. This can be advantageous when, e.g., a particular solver is not making progress towards finding a solution and/or when another solver having a different configuration is making superior progress. Therefore, it may be deemed to be making a more valuable use of the available computing resources if the other solver is replicated, or solvers similar to the other solver are employed. To this end, an ensemble may include a communication network, and a master console process (e.g., the master process 120, discussed with reference to FIG. 1) may receive from and/or send to various solvers, information about the behavior and progress of the individual solvers. The master console process may use machine learning (ML) methods and/or heuristic methods to decide modifications to the configurations of one or more solvers in the ensemble. In one embodiment, the ensemble configuration process can parse the observable aspects of the solver run and then, using heuristics, make a determination as to which solvers should be restarted and/or updated. The configuration of an individual solver may be updated or replaced with a different configuration as described above (e.g., by re-computing the arrays of scores) dynamically, or by requiring a restart of the solver.

In one embodiment, the method for mapping information from a running solver configuration to a Delta is based on a heuristic that references the model used to originally assign arrays of scores to options, i.e., based on the features of the problem to solver, and optionally based on training data and the corresponding solver configurations. The data received from one or more solvers, as they attempt to solve a problem, include but are not limited to a depth of a solver decision stack, a duration for which the decision stack is at a specified depth, an average number of implications per decision, an implication fan out degree for a variable, an average length of an implication sequence, a maximum length of an implication sequence, and an average size of conflict clauses. These data can be communicated to a master process and/or the ensemble configuration process on demand or periodically (e.g., after a fixed number of iterations of the iterative solver process). As described above, these data can be processed by a machine learning algorithm and/or a heuristic algorithm to compute the adjustment Delta.

In one embodiment, an ensemble constraint solver R-Solve is designed to run on message passing interface (MPI)-connected clusters. When executing on a cluster of interconnected processors, the constraint system to solved is replicated on each processor, and each processor runs an independent instantiation of the R-Solve constraint solving algorithm/process. R-Solve accepts as a constraint system Boolean logical formulas (and, or, and not expressions). The variables of the formula are Boolean variables, each accepting as a value either true or false. The constraint system for the Boolean satisfiability problem (also known as SAT) is that the logical formula must evaluate to true value. An R-Solve ensemble includes multiple instances of the R-Solve SAT constraint solving algorithm, each operating with a different collection of settings according to a set of tunable parameters (i.e., configuration). In R-Solve, the solver instances in the ensemble are able to communicate learned conflict clauses. These conflict clauses can be taken as summaries of areas of the search space which it has been determined do not contain a satisfying assignment. This communication is performed via broadcast from the source node to all other nodes in the ensemble.

In addition to the tunable parameters, a random seed is also associated with an instance of R-Solve. Even if the configuration of two instances of R-Solve are identical, if their random seeds have different values, the two instances can explore the search space in a different manner, and may explore similar but distinct solutions. The random seed has a special role in the R-Solve SAT solver. Modulo the random seed, the anticipated performance of a configuration can be defined as a probability space. The choice of random seed, in essence, selects a run of the solver from this space. In selecting configurations for an ensemble, there is a tradeoff between selecting twice from the same probability space (same configuration, different random seed) versus selecting two distinct configurations (one selection from each of two probability spaces).

In one embodiment, the ensemble configuration process can parse the training data that associate a Boolean satisfiability constraint problem instance, an ensemble configuration, and a time-to-solution. A machine learning method can use the parsed data to generate a for a specific, previously unseen Boolean satisfiability problem instance, a probability distribution of expected time-to-solution over the space of random seeds for each of the configurations represented in the training set. As part of mapping the features of the Boolean satisfiability problem to be solved to a set of solver configurations, a heuristic algorithm may be used to select for the ensemble between two distinct configurations versus two configurations that are identical, but have different random seeds.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, We claim:

1. A method for assigning a set of configurations to an ensemble comprising a plurality of solvers, the method comprising:
    for each candidate configuration in a plurality of candidate configurations, computing by a processor, based on, at least in part, a first set of features stored in memory, an array of aggregate scores, the array corresponding to a statistical parameter corresponding to a solution to the problem, and the first set of features being associated with a problem to be solved by the ensemble;
    assigning by the processor to a first solver in the plurality of solvers a first candidate configuration selected from the plurality of candidate configurations, based on, at least in part, the computed arrays of aggregate scores, wherein
    the array of aggregate scores computed for the first candidate configuration comprises a first aggregate score and a second aggregate score, and the second aggregate score is based on, at least in part, a distribution range associated with the statistical parameter.

2. The method of claim 1, wherein computing the array of aggregate scores comprises applying by the processor, a machine learning (ML) procedure to the first set of features.

3. The method of claim 1, further comprising assigning to a second solver in the plurality of solvers a second candidate configuration selected from the plurality of candidate configurations, the selection of the second candidate configuration being based on, at least in part, the computed arrays of aggregate scores.

4. The method of claim 1, wherein:
    each candidate configuration comprises a set of configuration parameters, a value for each configuration parameter being selectable from at least one option; and
    for each candidate configuration, the computation of an aggregate score in the array comprises assigning an option score to each configuration parameter based on, at least in part, an option designated to the configuration parameter.

5. The method of claim 1, wherein the second aggregate score represents a value for assigning a copy of the first candidate configuration to a solver in the ensemble.

6. The method of claim 1, wherein computing the array of aggregate scores comprises analyzing: (i) the plurality of candidate solver configurations, (ii) a second set of features, (iii) training data associating the plurality of candidate solver configurations and the second set of features, and (iv) the first set of features.

7. The method of claim 1, wherein the problem to be solved comprises a constraint satisfaction problem.

8. The method of claim 1, further comprising deriving by the processor, based on the problem to be solved, the first set of features associated with the problem to be solved.

9. The method of claim 1, wherein the statistical parameter comprises an expected time required to find the solution to the problem.

10. The method of claim 1, further comprising:
    receiving in memory, from at least a subset of solvers in the ensemble, runtime data associated with the set of configurations assigned to the ensemble; and
    updating an aggregate score in an array of aggregate scores associated with the first candidate configuration that is assigned to the first solver, by applying, by the processor, at least one of a heuristic analysis procedure and another machine learning procedure to the runtime data.

11. The method of claim 10, further comprising:
    updating, based on the updated aggregate score, a score for an option designated to a configuration parameter of the first candidate configuration;
    updating, based on the updated score of the option, an option score for another candidate configuration in which a corresponding configuration parameter is also designated the option designated to the configuration parameter of the first candidate configuration; and
    updating an aggregate score for the other candidate configuration based on, at least in part, the updated option score for the other candidate configuration.

12. A method for dynamically assigning a configuration to a solver in an ensemble comprising a plurality of solvers, the method comprising:
    receiving from at least a subset of solvers in the ensemble runtime data associated with a first set of configurations currently assigned to the solvers in the ensemble;
    applying by a processor at least one of a machine learning procedure and a heuristic analysis procedure to the runtime data to determine a new configuration to be assigned to a first solver in the ensemble, the new configuration being different than a configuration in the first set that is currently assigned to the first solver;
    assigning the new configuration to the first solver;
    identifying based on, at least in part, the runtime data a third solver in the ensemble performing below a preselected threshold; and designating the third solver as the first solver that is to be assigned the new configuration.

13. The method of claim 12, wherein assigning the new configuration comprises adjusting a configuration parameter of the first solver according to the new configuration without stopping the first solver.

14. The method of claim 12, wherein assigning the new configuration comprises:
stopping the first solver;
changing a configuration parameter of the first solver according to the new configuration after stopping the first solver; and
restarting the first solver.

15. The method of claim 12, further comprising identifying based on, at least in part, the runtime data a second solver in the ensemble performing at least at a preselected threshold.

16. The method of claim 12, wherein the runtime data comprises at least one of a depth of a solver decision stack, a duration for which the decision stack is at a specified depth, an average number of implications per decision, an implication fan out degree for a variable, an average length of an implication sequence, a maximum length of an implication sequence, and an average size of conflict clauses.

17. The method of claim 12, wherein the new configuration comprises at least one parameter selected from the group consisting of a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, and size of information to be shared between two solvers.

18. The method of claim 12, wherein the new configuration comprises at least one parameter comprising a combination of at least two of a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, and size of information to be shared between two solvers.

* * * * *